(12) United States Patent
Cotta et al.

(10) Patent No.: US 12,091,175 B2
(45) Date of Patent: Sep. 17, 2024

(54) SEAT UNIT EQUIPPED WITH A NOISE ATTENUATION PANEL

(71) Applicant: Safran Seats, Plaisir (FR)

(72) Inventors: Gérald Cotta, Moissy-Cramayel (FR); Arthur K. Glain, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/290,009

(22) PCT Filed: May 6, 2022

(86) PCT No.: PCT/EP2022/062251
§ 371 (c)(1),
(2) Date: Nov. 8, 2023

(87) PCT Pub. No.: WO2022/238248
PCT Pub. Date: Nov. 17, 2022

(65) Prior Publication Data
US 2024/0246677 A1 Jul. 25, 2024

(30) Foreign Application Priority Data
May 12, 2021 (FR) ........................................ 2105016

(51) Int. Cl.
*B64D 11/06* (2006.01)
(52) U.S. Cl.
CPC ............................... *B64D 11/0606* (2014.12)
(58) Field of Classification Search
CPC .............................. B64D 11/0606; E04B 1/74; E04B 2002/7418
See application file for complete search history.

(56) References Cited

U.S. PATENT DOCUMENTS

| 3,858,676 | A | 1/1975 | Le Masurier | |
|---|---|---|---|---|
| 2018/0099752 | A1* | 4/2018 | Johnson | ........... B64D 11/00152 |
| 2021/0229813 | A1* | 7/2021 | Glain | ................. B64D 11/0606 |

FOREIGN PATENT DOCUMENTS

| WO | 2003004355 A2 | 1/2003 |
|---|---|---|
| WO | 2019216927 A1 | 11/2019 |
| WO | 2019239204 A1 | 12/2019 |

OTHER PUBLICATIONS

International Patent Application No. PCT/EP2022/062251, English Translation of the Written Opinion of the International Searching Authority, dated Nov. 12, 2023.
International Patent Application No. PCT/EP2022/062251, International Search Report, Translation of International Search Report, and Written Opinion, dated Aug. 31, 2022.

* cited by examiner

*Primary Examiner* — Tye William Abell
(74) *Attorney, Agent, or Firm* — Kilpatrick Townsend & Stockton LLP

(57) ABSTRACT

The invention relates to a seat unit including a seat, at least one surrounding element associated with the seat, and a noise attenuation panel fixed to one face of the surrounding element. The noise attenuation panel can include a soft trim cover, and a support plate comprising at least one sound-permeable portion provided with at least one through hole. The support plate can be arranged such that there is an empty space between said sound-permeable portion and the face of the surrounding element of the seat.

12 Claims, 4 Drawing Sheets

[Fig. 1]
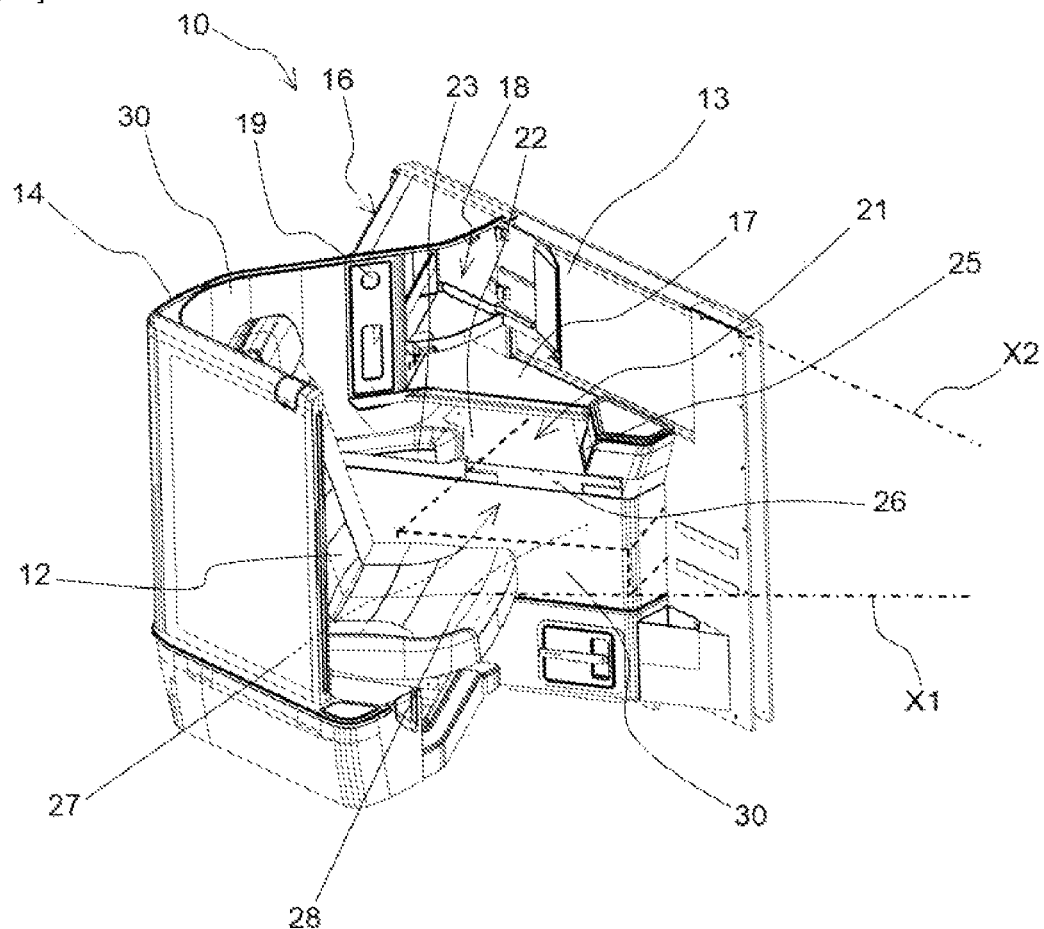
[Fig. 2]
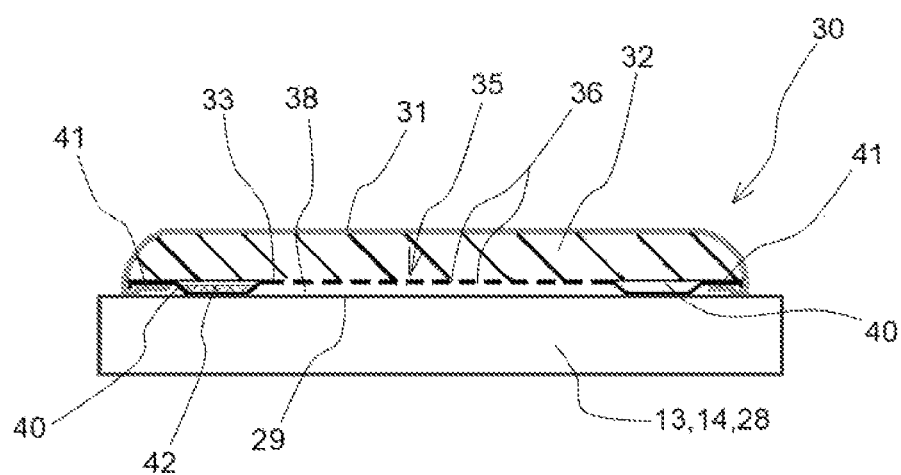

[Fig. 3]
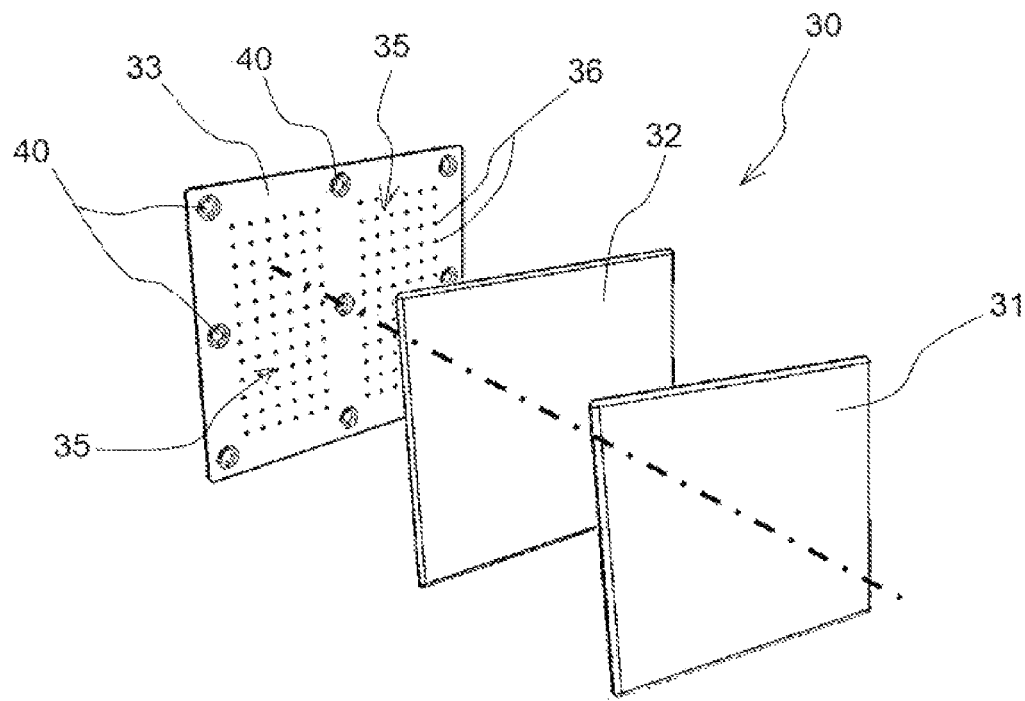
[Fig. 4]
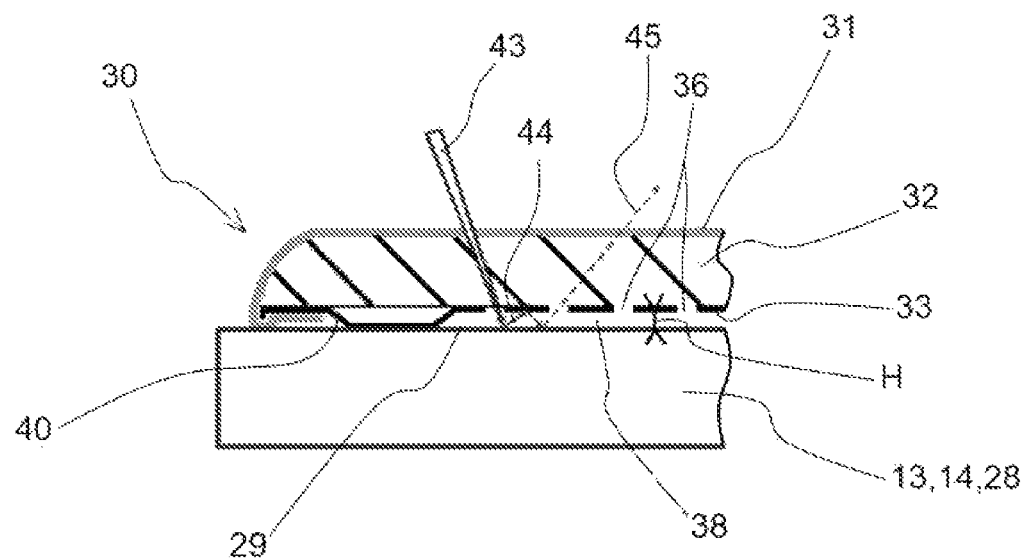

[Fig. 5a]
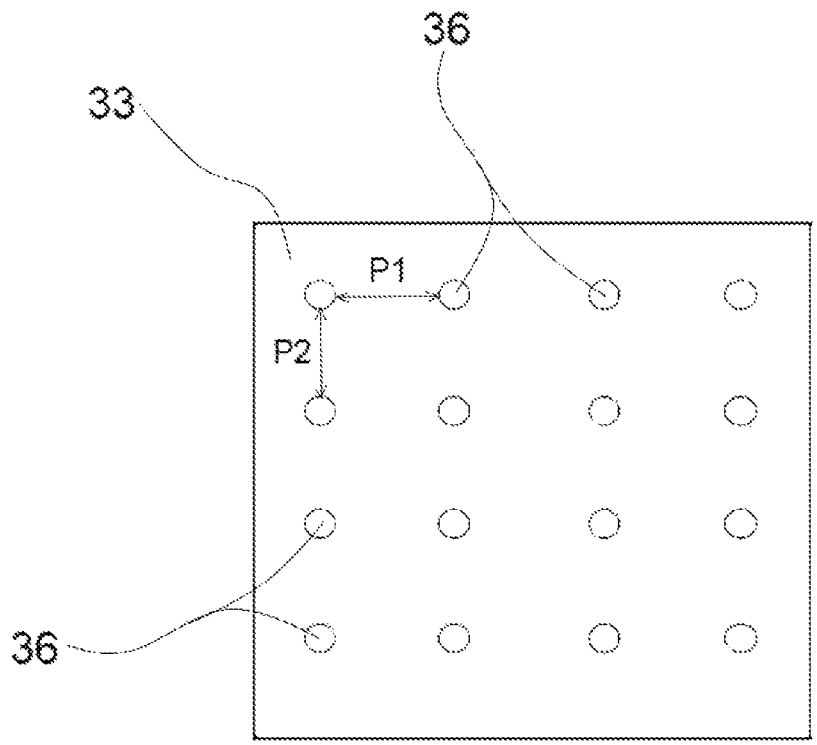
[Fig. 5b]
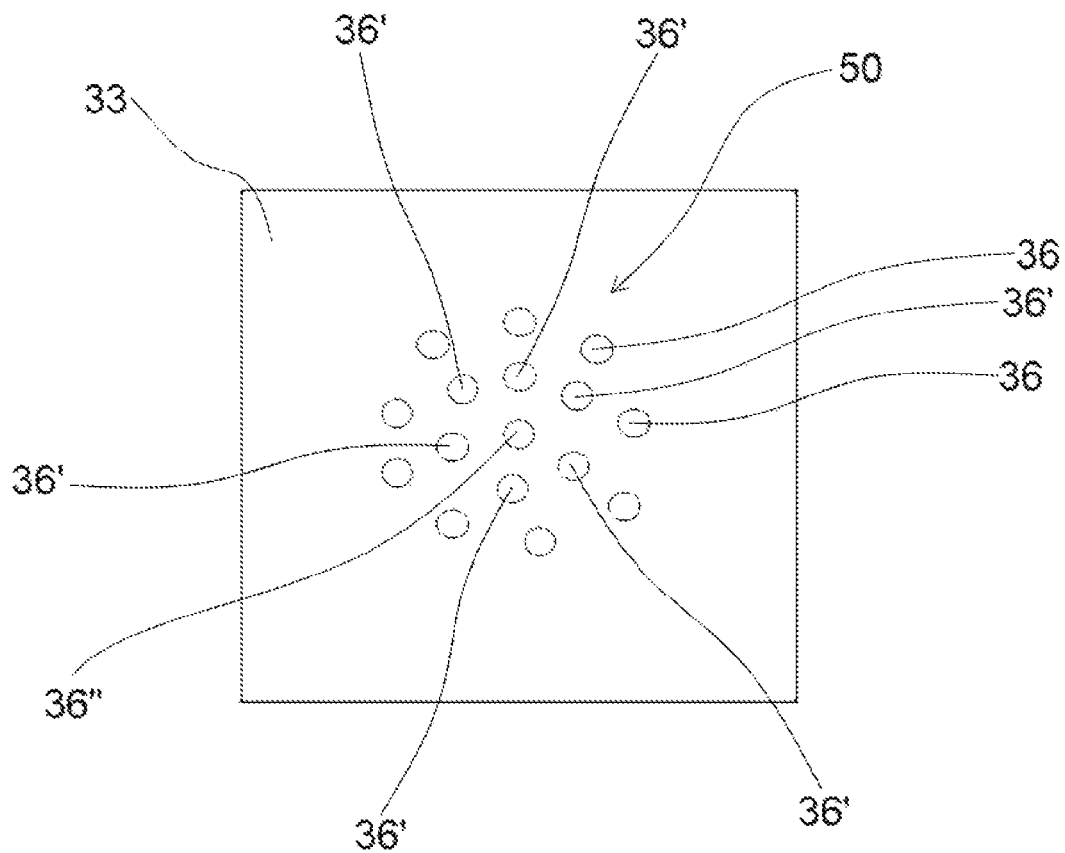

[Fig. 5c]
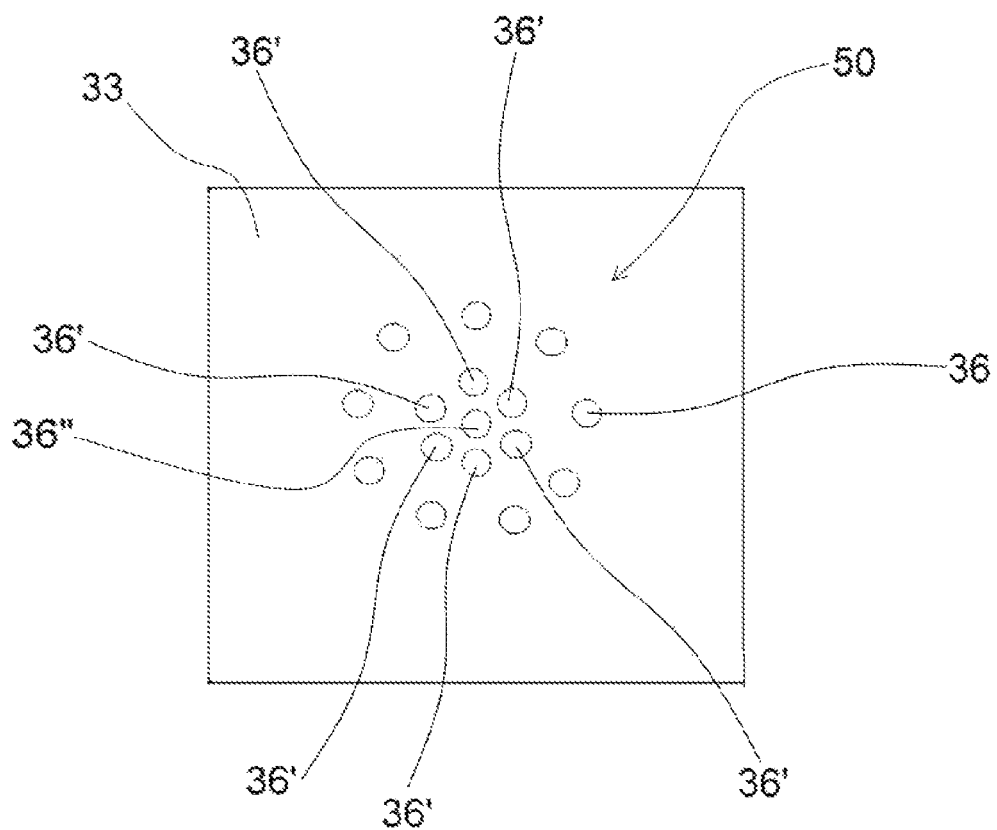
[Fig. 5d]
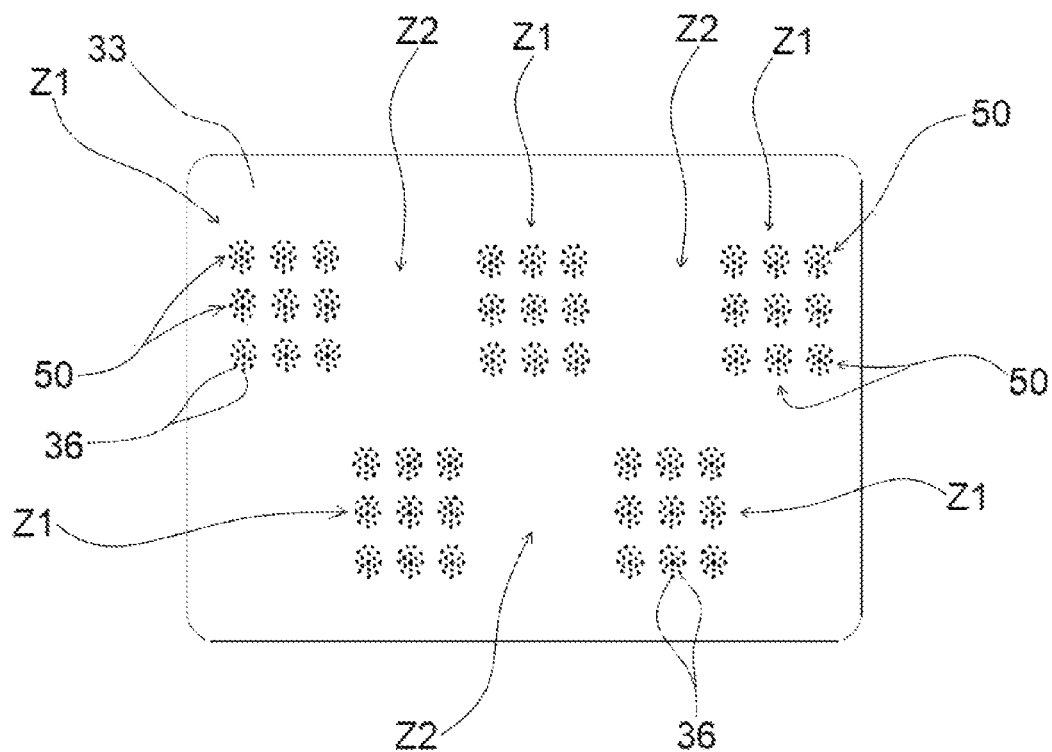

SEAT UNIT EQUIPPED WITH A NOISE ATTENUATION PANEL

CROSS REFERENCE TO RELATED APPLICATIONS

This application is the United States national phase application of International Patent Application PCT/EP2022/062251 ("the '251 application"), filed on May 6, 2022 and titled "SEAT UNIT EQUIPPED WITH A NOISE ATTENUATION PANEL," which application is related to and claims priority benefits of France Patent Application No. 2105016, ("the '016 application"), filed on May 12, 2021. The '251 and '016 applications are hereby incorporated in their entireties by this reference.

The present invention relates to a seat unit provided with a noise attenuating panel. The invention finds a particularly advantageous, but not exclusive, application with seat units of "business class" and "first class" type in an airplane cabin.

In a manner known per se, such a seat unit comprises a seat associated with a side console provided with storage spaces and with a shell extending at least partly around the seat so as to delimit a semi-enclosed space around the passenger. Such a configuration makes it possible to guarantee the privacy of the passenger seated on the seat.

The seat offers the passenger different comfort positions, from a "seated" position to a "lying" position, in which the seat defines a substantially horizontal sleeping surface so that the passenger can lie down. Intermediate comfort positions are also offered, such as the "relax" position in which one seat back is strongly inclined. Generally, these intermediate positions are obtained by inclining the pivoting backrest around a horizontal axis and perpendicular to an extension axis of the seat. The passenger can then remain on the seat during transitions between different positions. The seat generally consists in particular of the backrest and a seating surface and is likely to include a leg rest and/or a footrest, which may be fixed or linked to a kinematics of the seat.

Noise that may interfere with passenger rest is an important environmental concern to consider when developing a seat unit. There is therefore a need to reduce the perception of noise inside an aircraft cabin in order to optimize the acoustic comfort of passengers without reducing their living space.

The invention aims to effectively meet this need by proposing a seat unit comprising:
  a seat,
  at least one environmental element associated with the seat, and
  a noise attenuating panel fixed to one side of the environmental element,
  said noise attenuating panel comprising:
  a covering cap, and
  a support plate comprising at least one sound-permeable portion provided with at least one through hole, said support plate being arranged in such a way that there is an empty space between said sound-permeable portion and the face of the seat environment element.

The invention thus makes it possible, thanks to through holes in the support plate, to provide a compact sound trap integrated into the environmental element of the seat. In fact, the through holes allow the passage of sound waves into the empty space separating the support plate from the environmental element of the seat, so that after multiple reflections inside this space the noise intensity perceived by the passenger in the seat is greatly reduced.

According to one embodiment of the invention, the noise attenuating panel further comprises a layer of sound absorbing material between the covering cap and the support plate.

According to one embodiment of the invention, the layer of sound absorbing material is made of a material chosen in particular from: a fibrous material, a non-woven material, a wadding-based material, or a foam-based material.

According to one embodiment of the invention, the noise attenuating panel is configured to have a sound absorption peak for frequencies between 20 Hz and 20 kHz, preferably between 600 Hz and 4 KHz.

According to one embodiment of the invention, a height of the empty space between the support plate and the face of the environmental element is between 1 mm and 15 mm and is preferably 3 mm.

According to one embodiment of the invention, the support plate is made of a thermoformed plastic material or is constituted by an injected plastic part.

According to one embodiment of the invention, the support plate comprises at least one through hole having a diameter between 1 mm and 15 mm. If the support plate has several holes, these holes can all have the same diameters or different diameters. Likewise, the shape of these holes is not limited to circular shapes but to all possible geometric shapes.

According to one embodiment of the invention, the support plate comprises feet bearing against the face of the environmental element of the seat.

According to one embodiment of the invention, the support plate comprises removable fixing means for the noise attenuating panel on the face of the environmental element of the seat.

According to one embodiment of the invention, the covering cap is made of a sound-permeable material.

According to one embodiment of the invention, the environmental element associated with the seat is chosen from: a privacy shell extending at least partly around the seat, a console, or an ottoman.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of the realization thereof and, if necessary, contribute to the definition thereof, in which:

FIG. 1 is a perspective view of a seat unit according to the invention comprising noise attenuating panels;

FIG. 2 is a sectional view of a noise attenuating panel mounted on an environmental element of the seat;

FIG. 3 is an exploded perspective view of the different components of a noise attenuating panel according to the present invention;

FIG. 4 is a partial sectional view illustrating the phenomenon of sound absorption by the noise attenuating panel according to the invention;

FIGS. 5*a*, 5*b*, 5*c*, and 5*d* illustrate different types of distributions of the perforations in the support plate of a noise attenuating panel according to the invention.

It should be noted that the structural and/or functional elements common to the different embodiments have the same references. Thus, unless otherwise stated, such elements have identical structural, dimensional and material properties.

Furthermore, in the remainder of the description, the relative terms such as "front", "rear", "horizontal", "vertical" are understood by reference to the common meaning according to a passenger on a seat associated with the seat unit according to the invention.

FIG. 1 shows a seat unit 10 comprising a seat 12 associated with a side console 13 extending along one side of the seat 12.

In addition, a shell 14, so-called a privacy shell, extends at least partly around the seat 12 so as to delimit a semi-enclosed space around the passenger. The privacy shell 14 is made for example from a composite material. Such a configuration makes it possible to guarantee the privacy of the passenger on the seat 12. A video screen 16 of a multimedia system or IFE (for "Inflight Entertainment System") could be installed on a rear part of the privacy shell 14 so as to be usable by a rear passenger.

The console 13 may include an upper face 17 forming a table on which the passenger can place objects as well as a storage space 18 comprising one or more elements from a literature pouch, a bottle holder, or a minibar. The choice of storage spaces is configurable according to the wishes of the airline. The console 13 may also include a reading light 19 for directing light towards the seat 12.

A cavity 21 is located under the upper wall. The cavity 21 is open laterally towards the seat 12. In addition, a horizontal face 22 of the console 13 has in particular an armrest function. For this purpose, the horizontal face 22 may locally have the shape of a curved cuff 23 matching the shape of part of the passenger's arm.

The console 13 also includes a control unit 25 for the seat 12 and its additional components (so-called "PCU" for "Passenger Control Unit"). The control unit 25 allows the passenger in particular to control the selection of position of the seat 12 as well as the ancillary components, such as a video system, a heating device, an ambient lighting system, or any other additional component that can be integrated into the seat 12.

The seat unit 10 may also conventionally include a dining table 26 movable between a stored position (corresponding to that shown in FIG. 1) in which the dining table 26 is located inside a housing provided in the console 13 and a deployed position in which the meal tray 26 is located outside the housing in order to allow the passenger to place a meal tray thereon.

The seat 12 is advantageously provided with kinematics allowing it to be movable between a "seated position, in which the seat 12 is configured to define a seated position for a passenger, and a "lying" position, in which the seat 12 is configured to define a sleeping surface for the passenger, advantageously substantially horizontal. Intermediate comfort positions are also offered, such as the "relax" position in which a back of the seat 12 is strongly inclined.

In order to allow the passenger to lie down, the console 13 includes a housing 27, seen through transparency in FIG. 1, in which an ottoman 28 is arranged. The ottoman 28 has a horizontal face forming a footrest on which a rear passenger can place his/her feet when the seat 12 is in the "lying" position.

The seat 12 includes an extension axis X1 defined by the intersection of a horizontal plane and a vertical median plane of the seat 12 corresponding to a plane of symmetry of the seat 12. The extension axis of the seat 12 could form a non-zero angle relative to a direction parallel to or coincident with a central axis of the aircraft. In this case, the seat 12 is turned towards the axis. Alternatively, the seat 12 can be oriented in an opposite direction to the axis X2.

Furthermore, a noise attenuating panel 30 could be fixed on one face of the privacy shell 14. The noise attenuating panel 30 could be fixed on a front face of the privacy shell 14 on the side of the seat 12. Alternatively or in addition, the noise attenuating panel 30 could be fixed on the rear face of the privacy shell 14. The noise attenuating panel 30 could also be fixed on a side face of the console 13 on the side of the seat 12 or on one face of the ottoman 28. Thus, the noise attenuating panel 30 can be fixed on one or more environmental elements of the seat, in particular chosen from: the privacy shell 14, the console 13, or the Ottoman 28.

According to a particular embodiment, noise attenuating panels 30 are provided on the faces of the different environmental elements 13, 14, 18 surrounding the passenger when the seat 12 is in the lying position. This creates a quiet space around the passenger when s/he sleeps in order to improve her/his comfort. However, in other embodiments, a noise attenuating panel 30 may be placed only on the face of only one of the environmental elements of the seat 12.

As can be seen in FIGS. 2 and 3, this noise attenuating panel 30 comprises a covering cap 31, a layer of sound absorbing material 32, and a support plate 33. The support plate 33 comprises at least a sound-permeable portion 35 provided with at least one through hole 36. Preferably, the sound-permeable portion 35 is provided with a plurality of through holes 36 (also called perforations 36). The support plate 33 is arranged in such a way that there is an empty space 38 between the sound-permeable portion 35 and the face 29 of the environmental element of the seat to which the panel 30 is fixed.

As explained in more detail below, a sound trap is thus formed in which the through holes 36 allow the passage of sound waves into the empty space 38 separating the support plate 33 from the face 29 of the environmental element of the seat 12. After multiple reflections between the face 29 of the environmental element and the layer of sound absorbing material 32, the noise intensity perceived by the passenger in the seat 12 is greatly reduced.

More precisely, the covering cap 31 is made of a sound-permeable material. The material of the covering cap 31 is also chosen so as to give an aesthetic finish to the whole. The covering cap 31 could for example be made from a material such as textile, leather, imitation leather, alcantara or any other flexible material suitable for the application. The material used may include a multitude of perforations to facilitate the passage of sound through the covering cap 31.

The covering cap 31 may have decorative patterns on its visible parts when the panel 30 is placed on the environmental element of the seat 12. These decorative patterns may be personalized according to the airline.

The layer of sound absorbing material 32 is arranged between the covering cap 31 and the support plate 33. The layer of sound absorbing material 32 is made of a material chosen in particular from: a fibrous material, a non-woven material, a wadding-based material, or a foam-based material or any other sound-absorbing material suitable for the application.

The support plate 33 is advantageously made of a thermoformed plastic material. The support plate 33 has a small thickness, for example between 1 mm and 3 mm. According to one embodiment, a plate 33 made of a thermoplastic material is used. This plate is heated then shaped with the help of a die. Once cooled, the plate retains the shape given by the die.

FIGS. 2 and 3 have been shown for a flat support plate 33 in order to facilitate understanding of the invention, but it is clear that the support plate 33 may have a curved shape corresponding to that of the environmental element of the seat 12. In particular, the thermoforming die can give the support plate 33 a curvature corresponding to that of the privacy shell 14. Such a configuration makes it possible to maintain the distance between the support plate 33 and the face 29 of the privacy shell 14.

We can then carry out a machining step, so-called "trimming" step, consisting of cutting an unnecessary edge of the part for finishing off. It is possible to take advantage of this machining step to produce the through holes 36 in the support plate 33 in order to obtain the sound-permeable portion 35. Alternatively, the plate used for thermoforming may have been perforated beforehand in the plate heating step. In all cases, the through holes 36 of the support plate 33 do not extend into the layer of sound absorbing material 32.

Alternatively, the support plate 33 consists of an injected plastic part. In this case, the through holes 36 can be obtained directly during the injection of the part.

The support plate 33 comprises feet 40 bearing against the face 29 of the environmental element 13, 14, 28 so as to create the empty space 38 between the sound-permeable portion 35 and the environmental element. The feet 40 may be constituted by local shaping of the support plate 33. The support plate 33 thus comprises projecting portions forming feet 40 integral with the rest of the support plate 33.

In order to ensure the assembly of the noise attenuating panel 30, the covering cap 31 covers the layer of sound absorbing material 32 arranged against the support plate 33, as shown in FIG. 2. The covering cap 31 is provided with a flap 41 fixed against one edge of the support plate 33. The fixing of the flap 41 of the covering cover 31 to the panel 30 can be carried out by gluing, by insertion into a retaining groove, or any other suitable fixing technique with or without gluing.

Furthermore, the support plate 33 comprises removable fixing means 42 for fixing the noise attenuating panel 30 to the face 29 of the environmental element 13, 14, 28 of the seat 12. The choice of fixing means 42 depends in particular on the integration constraints of the panel 30 and its positioning in the seat unit 10. In the case where the panel 30 is arranged in a visible zone of the seat unit 10, discreet fixing means 42 are used that are removable without the use of tools, such as for example snap-fit devices, so-called "Velcro" fasteners (registered trademark) formed by complementary loops and hooks, magnetic fasteners, or any other fixing device suitable for the application.

Given that the Velcro fasteners or the magnetic fasteners have a thickness of about a few millimeters, it is possible to eliminate the production of the feet 40 in the support plate 33. In fact, the fasteners then constitute spacers making it possible to create the empty space 38 between the panel 30 and the face 29 of the environmental element 13, 14, 28.

In the case where the panel 30 is placed in a non-visible area of the seat unit 10, in particular a technical area located in the lower part of the seat unit 10, screws can be used to fix the panel 30 to the environmental element 13, 14, 28. Alternatively, it is also possible to use tree rivets or any other fixing means suitable for the application. This type of fixing means makes it possible to guarantee the retention of the panel 30 in the context of certification tests during which significant decelerations are applied to the seat unit 10.

As illustrated in FIG. 4, the panel 30 constitutes a sound trap based on the Helmholtz principle of sound reflection inside the cavity 38 between the environmental element 13, 14, 28 and the support plate 33.

Indeed, a sound wave 43 passes through the covering cap 31 then is attenuated by the layer of sound absorbing material 32. The through holes 36 allow the passage of the attenuated part of the sound wave into the empty space 38 separating the support plate 33 from the face 29 of the environmental element 13, 14, 28. After multiple reflections 44 between the face 29 of the environmental element 13, 14, 28 and the face of solid portions of the support plate 33, the intensity of the sound wave 45 from the noise attenuating panel 30 is very low. The noise perceived by the passenger in the seat 12 is thus greatly reduced.

Advantageously, the noise attenuating panel 30 is configured to have a sound attenuation peak for frequencies between 20 Hz and 20 kHz, preferably between 600 Hz and 4 KHz. In order to obtain the desired attenuation peak, it is possible to modify the diameter of the holes 36 in the support plate 33, the height H of the empty space 38 between the support plate 33 and the environmental element 13, 14, 28, as well as the thickness of the layer of sound absorbing material 32. The height H is measured in a direction perpendicular to the face 29 of the environmental element 13, 14, 28.

The support plate 33 comprises at least one perforation 36 having a larger dimension between 0.1 mm and 15 mm, in particular between 0.1 mm and 5 mm, and preferably about 1 mm. By "about" we mean a possible variation of plus or minus 10% around the indicated value. For a perforation 36 having a circular shape, the "largest dimension" of the perforation corresponds to the diameter of the perforation 36. If the support plate 33 has several circular perforations 36, these circular perforations 36 can all be of the same diameter or of different diameters. Likewise, the shape of the perforations 36 is not limited to circular shapes but to all possible geometric shapes, such as rectangular, square, triangular, oval, hexagonal, or other shapes.

A perforation rate corresponding to the ratio of the sum of the surfaces of the perforations 36 to the total surface of the support plate 33 is between 1 and 30% and is preferably about 12%.

FIGS. 5a, 5b, 5c, and 5d illustrate different types of distributions of the perforations 36 in the support plate 33.

In the embodiment in FIG. 5a, the perforations 36 are separated from each other by a regular pitch corresponding to a distance between two successive perforations. The perforations 36 are arranged in a plurality of horizontal rows and vertical columns. There is a pitch P1 between two adjacent perforations 36 in the same row and a pitch P2 between two adjacent perforations 36 in the same column. The pitches P1 and P2 may be equal or different.

In the embodiment in FIGS. 5b and 5c, the perforations 36 are configured in a pattern 50 of circular shape. The arrangement of the perforations 36 inside the pattern 50 may vary so as to adapt the panel 30 to the range of frequencies to be attenuated. For example, the intermediate perforations 36' of the embodiment in FIG. 5c are closer to a central perforation 36" than the intermediate perforations 36' of the embodiment in FIG. 5b. The pattern 50 may include any number of circular rows of perforations 36, 36'. Alternatively, the perforations 36, 36', 36" may be arranged in a pattern 50 other than a circular pattern, in particular a triangular, rectangular, square, oval pattern, or any other shape of pattern 50 adapted to the application.

In the embodiment in FIG. 5d, there is an alternation of zones of perforations Z1 and zones 22 without any perforation. Each zone of perforations Z1 comprises a plurality of perforation patterns 50. Each pattern of perforations 50 comprises a plurality of perforations 36 arranged in a pattern having a particular shape, in this case a circular shape. Alternatively, as indicated previously, the perforation patterns 50 may have a shape other than circular, such as a rectangular, square, oval, or other shape. The perforation patterns 50 are spaced apart from each other within a zone of perforations Z1. A gap between two patterns 50 of the same zone of perforations Z1 is less than a gap between two patterns 50 of two adjacent zones of perforations Z1 due to their separation by a zone Z2 without any perforation. Such a configuration makes it possible to target certain frequencies to be attenuated.

The height H of the empty space 38 measured between the sound-permeable portion 35 and the environmental element 13, 14, 28 is between 1 mm and 15 mm and is preferably 3 mm. A thickness of the layer of sound absorbing material 32 may be between 1 mm and 50 mm and is preferably 6 mm.

Although the embodiment in FIGS. 2 to 4 implements a layer of sound absorbing material 32, the presence of this layer of sound absorbing material 32 is not essential to the realization of the invention and can therefore be omitted. The noise attenuating panel 30 then comprises only a covering cap 31 and the support plate provided with at least one sound-permeable portion 35.

In this case, the sound waves penetrating through the covering cap 31 penetrate through the sound-permeable portion 35 of the support plate 33 via the through hole (s) 36. The sound waves are then attenuated due to the multiple reflections inside the empty space 38 separating the support plate 33 from the environmental element 13, 14, 28. The presence of the layer of sound absorbing material 32 makes it possible to reinforce the effectiveness of the device by attenuating the sound waves through this layer 32.

Of course, the different features, variants and/or embodiments of the present invention can be associated with each other in various combinations as long as they are not incompatible of each other or exclusive from each other.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. A seat unit comprising:
a seat, and
at least one environmental element associated with the seat, wherein a noise attenuating panel is fixed to one face of the environmental element, said noise attenuating panel comprising:
a covering cap, and
a support plate comprising at least one sound-permeable portion provided with at least one through hole, said support plate being arranged in such a way that there is an empty space between said sound-permeable portion and the face of the environmental element of the seat.

2. The seat unit according to claim 1, wherein the noise attenuating panel is configured to have a sound absorption peak for frequencies between 20 Hz and 20 kHz.

3. The seat unit according to claim 1, wherein a height of the empty space between the support plate and the face of the environmental element is between 1 mm and 15 mm.

4. The seat unit according to claim 1, wherein the support plate comprises at least one through hole having a diameter between 1 mm and 15 mm.

5. The seat unit according to claim 1, wherein the support plate comprises feet bearing against the face of the environmental element of the seat.

6. The seat unit according to claim 1, wherein the support plate comprises removable fixing means for fixing the noise attenuating panel to the face of the environmental element of the seat.

7. The seat unit according to claim 1, wherein the covering cap is made of a sound-permeable material.

8. The seat unit according to claim 1, wherein the environmental element associated with the seat is chosen from: a privacy shell extending at least partly around of the seat, a console, or an ottoman.

9. The seat unit according to claim 1, wherein the noise attenuating panel is configured to have a sound absorption peak for frequencies between 600 Hz and 4 kHz.

10. The seat unit according to claim 1, wherein a height of the empty space between the support plate and the face of the environmental element is 3 mm.

11. The seat unit according to claim 1, wherein the noise attenuating panel further comprises a layer of sound absorbing material arranged between the covering cap and the support plate.

12. The seat unit according to claim 11, wherein the layer of sound-absorbing material is made of a material chosen in particular from: a fibrous material, a non-woven material, a wadding-based material, or a foam-based material.

* * * * *